United States Patent [19]
Lamberti et al.

[11] 3,873,614
[45] Mar. 25, 1975

[54] PROCESS FOR PREPARING OXIDIZED CARBOHYDRATES AND PRODUCTS

[75] Inventors: Vincent Lamberti, Upper Saddle River; Susan L. Kogan, Fort Lee, both of N.J.

[73] Assignee: Lever Brother Company, New York, N.Y.

[22] Filed: Nov. 13, 1972

[21] Appl. No.: 306,098

Related U.S. Application Data

[63] Continuation-in-part of Ser. No. 162,706, July 13, 1971, abandoned.

[52] U.S. Cl. ...... 260/535 P, 260/233.3 R, 260/528, 252/89, 252/467, 252/471, 252/474, 252/475, 252/476
[51] Int. Cl. ...................... C07c 51/28, C07c 59/22
[58] Field of Search ......... 260/528, 535 P, 233.3 R

[56] References Cited
UNITED STATES PATENTS
3,595,909    7/1971   Sheldon ............................ 260/528

OTHER PUBLICATIONS
Busch et al., "J. Org. Chem.," Vol. 1, (1938), pp. 1–16.

Katai et al., "J. Polymer Sci.,"Part A-1, Vol. 4, 2683–2701, (1966).

Jurado-Soler et al., "Bull. Soc. Chim. France," (1963), pp. 2119–2122.

Pigman, "The Carbohydrates," Vol. IIA, (1970), pp. 405–407.

*Primary Examiner*—James A. Patten
*Assistant Examiner*—Michael Shippen
*Attorney, Agent, or Firm*—Arnold Grant, Esq.

[57]   ABSTRACT

Carbohydrates, containing vicinal hydroxy groups in the monomeric unit, such as starches, glycogens, dextrans, sucrose and the like are smoothly oxidized to the corresponding open chain dicarboxyl derivatives by silver oxide or a mixture of silver oxide and silver in an aqueous alkaline medium. The dicarboxyl derivatives of carbohydrates produced by the aforementioned process are useful as detergency builders and soil suspending agents.

10 Claims, No Drawings

PROCESS FOR PREPARING OXIDIZED CARBOHYDRATES AND PRODUCTS

This application is a continuation-in-part of copending application, Ser. No. 162,706, filed July 13, 1971, now abandoned. The invention is concerned with the oxidation of carbohydrates, including polysaccharides, and with the products so obtained. The invention is concerned in particular with the production of dicarboxyl carbohydrates, which are useful as detergency builders and soil suspending agents.

The oxidation of polysaccharides, such as starch and cellulose, is well described in the literature. In the well-known two stage preparation of dicarboxyl starch, the starch is oxidized firstly with sodium periodate or periodic acid to produce dialdehyde starch and in a second step the aldehyde groups are oxidized with a different oxidizing agent to carboxyl groups. This process is expensive and not conductive to large-scale production.

It has now been found that an aqueous alkaline silver oxide system will cleave the vicinal glycol structure in carbohydrates, including polysaccharites such as starch, to form the corresponding dicarboxyl derivative in high yields, without extensive degradation of the polymer chain. In addition, the expensive processing required by prior methods for making dicarboxyl polysaccharides can be avoided. The oxidation of vicinal glycol groups in monomers to give two moles of carboxylic acid using alkaline-alcoholic solutions of silver oxide/silver or silver/oxygen, is described by Kubias, J., Collection Czech. Chem. Commun. 31, 1666 (1966). This indicates that such vicinal glycols react easily in anhydrous systems, but that in aqueous alcoholic solutions the reaction rates are slower and the yields much lower than in anhydrous systems. For example, the oxidation of 1,2-cyclohexanediol to adipic acid was accomplished in 100% yield in 30 minutes by employing an anhydrous ethanol-potassium hydroxide mixture, while a medium containing 50% water/50% isopropanol and sodium hydroxide afforded a yield of only 20% after 2 hours.

In addition, it has been reported in the literature that aqueous alkaline solutions of silver oxide completely oxidize glucose, a monosaccharide, to carbon dioxide and oxalic, formic and glyoxylic acids. Accordingly, it was surprising to discover that in a completely aqueous/alkaline silver oxide system, excellent yields of dicaboxyl products are obtainable from polysaccharides. In addition, contrary to reported data, it has been found that the more soluble materials react preferably, with the oxidation of disaccharides occurring spontaneously, and that starch-like products remain substantially highly polymerized.

The objects of the present invention are accomplished by oxidising polysaccharides having vicinal hydroxyl groups using silver oxide or a system capable of generating silver oxide in aqueous alkaline medium recovering the desired oxidized product and recycling the silver generated.

In its broadest aspects the present invention provides a process for preparing oxidized derivatives of carbohydrates, including polysaccharides, using silver oxide in an aqueous alkaline medium. The carbohydrates which are defined as being usable as the starting materials in the process are polysaccharides and alkyl glycosides containing vicinal hydroxyl groups. Suitable polysaccharides include starches such as corn, potato, rice arrow root, tapioca, wheat and sago starches; dextrin; cellulose; glycogens; dextrans; disaccharides such as sucrose, lactose, maltose and cellobiose; oligosaccharides; polyuronic acids such as pectin and alginic acid, and natural gums such as arabic and acacia. It is also possible to use as starting materials polysaccharides which have been chemically modified, for example by partial hydrolysis, esterification, etherification, carboxylation or cross-linking prior to or during oxidation, provided they can still be oxidised to the dicarboxyl or tricarboxyl polysaccharides. For reasons of availability and cost, it is generally preferred to use either starch, cellulose (natural or regenerated) or sucrose. It will be apparent that the term "polysaccharide" as used herein includes di- and oligosaccharides as well as megasaccharides.

As mentioned above, the carbohydrate may be an alkyl glycoside, particularly where the alkyl group is a methyl or ethyl group, and the term is used to include compounds with hydroxy alkyl groups, for example hydroxyethyl groups. Examples of specific alkyl glycosides are methyl-α-glucopyranoside, methyl-β-fructopyranoside, ethyl-β-fructofuranoside, methyl-β-glucuronoside and α-methyl-galactomethylpyranoside. The oxidation products are generally dicarboxylic acids of much lower molecular weight than the oxidation products of polysaccharides, which tend to improve biodegradability, an important factor for some uses of the oxidation products, especially as detergency builders.

Where the carbohydrate is starch or cellulose the process may be pictorially shown as follows, for purpose of illustration only;

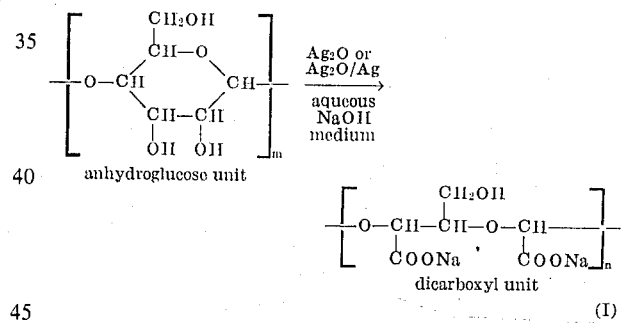

(I)

where $m$ is the number of monomeric units in the polysaccharide and $n$ is the number of dicarboxyl units introduced in the molecule; $m-n$ is thus the number of anhydroglucose units remaining in the molecule. The value of $n$ above may range from about 1 to about 100 per 100 repeating units in the molecule, depending on the extent of oxidation desired.

It should be understood that when the carbohydrate is polymeric, as shown in formula (I) above, there are many possible sequences of the two basic units for each possible composition. That is, the units in the polymer are in random order. For example, there may be many dicarboxyl units connected to each other before the appearance of an anhydroglucose unit or units. However, the overall composition of the mixture of different molecules can be shown by the pictorial representation (I).

Furthermore, the molecular weight of the product will also vary and depend on the molecular weight of the starting material. If the starting material is a starch, the molecular weight will depend on the type of starch selected, for example, $m$ will be from about 400 to about 500 if corn starch is used.

Also, it must be understood that the pictorial representation (I) is a very much simplified version of the actual structures involved. More specifically, it is well known for example that many starches can contain as a major constituent thereof amylopectin which has a branched-chain structure as opposed to the linear-chain molecules of amylose. Since the amylpectin polymers are linked by hemiacetal links at the uronic hydroxyl at the exit position in the anhydroglucose ring, derivatives such as the dicarboxyl starches may also contain considerable substitution at the uronic hydroxyl sites besides the simple linear chains described above.

If cellulose is used as the starting material for making the builder compound, the structure of the product is also complex. Cellulose has the following structure:

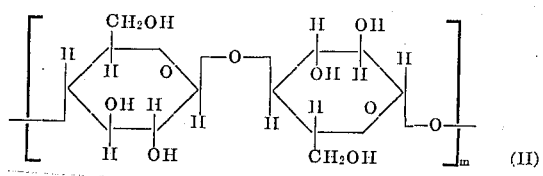
(II)

in which the anhydroglucose units are linked as in cellobiose, and wherein $m$ is generally in the range of 250 to 2,500.

As can be seen from the pictorial representation (II), one or both rings of the cellobiose unit are capable of being cleaved, resulting in a random distribution of the dicarboxyl units and anhydroglucose units in the final product. However, the oxidation process can still be described by reference to the pictorial representation (I).

It will be understood that some of the polysaccharides such as alginic acid, already contain carboxyl groups, in which case the oxidation product product will contain three carboxyl groups. It is also possible to make similar tricarboxyl materials, derivatives, for example by oxidation of the uronic hydroxyl groups in starch, preferably before the oxidative ring cleavage takes place. Such compounds derived from starches and cellulose can be generally represented as follows:

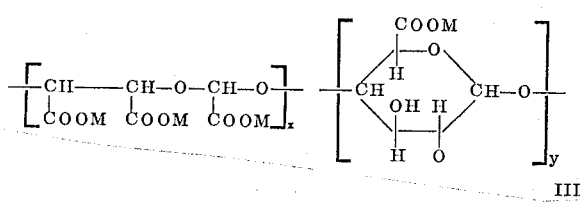
III wherein M is a hydrogen atom, an alkali metal, ammonium, or substituted ammonium cation; $x$ is from about 1 to about 100 and $y$ is from 0 to about 99 per 100 repeating units of the molecule.

In the case where the starting material is a disaccharide such as sucrose, lactose, maltose or cellobiose the product is an open-chain tetracarboyl compound. In the case of sucrose, for example, tetracarboxyl sucrose is obtained as a mixture of three tetracarboxylate compounds, which may be depicted as follows:

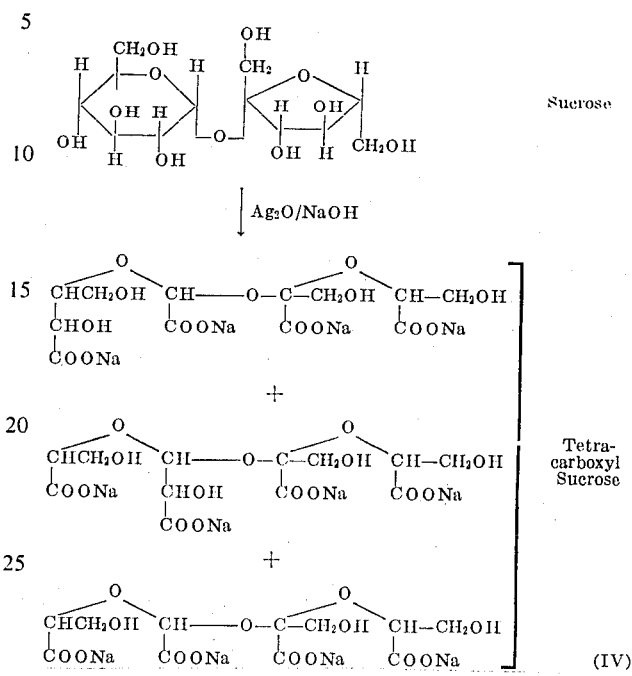
(IV)

It will be apparent that dicarboxyl derivatives are also obtainable from disaccharides when only one ring is cleaved to give a dicarboxyl unit. These compounds are obtained by using the stoichiometric or less than the stoichiometric amount of silver oxide required to oxidize only one of the rings of the disaccharide molecule.

In the case of methy-α-glucopyranoside the reaction (for complete oxidation of vicinal hydroxyl structure) can be illustrated as follows:

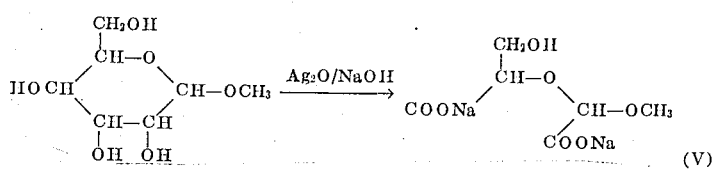
(V)

disodium α-methoxy-α'-hydroxymethyl-oxydiacetate

The oxidized polysaccharides obtained according to the process of the present invention will be in the form of the salt corresponding to the base utilized in the alkaline reaction medium. Other salts, however, can be readily obtained. For example, the salt form can be ion-exchanged to produce the free carboxylic acid form, which can then be neutralised with other alkali metal hydroxides, ammonium hydroxide or organic bases such as monoethanolmine, diethanolamine, triethanolamine, morpholine, and tetramethyl ammonium hydroxide. However, if the oxidized carbohydrate product is intended for use as a detergency builder where the absence of any nitrogen may be desired, then only the alkali metal salts would be used.

in a preferred aspect of the process of the present invention, a carbohydrate is contacted with silver oxide or a mixture of silver oxide and silver in an aqueous alkaline medium, whereby oxidative ring cleavage takes place, without any substantial cleavage of the glycoside links in the molecule. The pH of the reaction medium containing the oxidised carbohydrate and a colloidal suspension of silver is then lowered by addition of a suitable acid to effect separation of the silver phase and the oxidised carbohydrate, whereupon the oxidized carbohydrate is recovered and purified by conventional techniques.

The aqueous alkaline media utilized in the process of the present invention are suitably derived from the normal alkali metal or alkaline earth metal hydroxides; preferably sodium or potassium hydroxides, although other strong bases may be used. The amount of a base utilized in the reaction medium should be at least sufficient to neutralize all carboxyl groups formed by oxidation of the carbohydrate although an excess over the theoretical quantity is desired to effect practical reaction rates. Preferably it is desirable to use from about 2:1 to 4:1 mole ratio of the base to the carbohydrate.

Although a completely aqueous alkaline medium is preferred, alcoholic aqueous alkaline medium, containing not more than 20% alcohol, may also be used as the reaction medium.

In general the oxidation of the carbohydrates may be effected over a temperature range of about 35° to 90°C, preferably about 35° to 80°C, and more preferably about 40° to 60°C, depending on the carbohydrate employed as the starting reactant. More specifically, carbohydrates such as low MW polysaccharides which are soluble in aqueous solution will be spontaneously oxidized at room temperature (20°C). On the other hand, if the carbohydrate is relatively insoluble in aqueous solution, as for example with higher MW polysaccharides, higher temperatures are required to initiate the reaction. Thus, in the case of sugar and hydrolyzed starch, the reaction is initiated without the aid of external heat, and in the case of unmodified starch a temperature of about 35° to 50°C affords an acceptable rate and extent of reaction. By operating the reaction below a maximum temperature of about 90°C, but preferably at a temperature below about 80°C, little or no oxidation of any primary alcohol function occurs. In addition, by operating below about 60°C degradation of the long polymer chain in polysaccharides is held to a minimum. These features are important in the case of oxidized polysaccharides which are to be employed as detergency builders.

The silver oxide used in the present invention is preferably in a finely divided state and oxidation may be effected in the presence of added silver. In a preferred embodiment of this aspect of the invention, it is desirable to use silver oxide alone. Of course, economics dictates that the smallest amount of silver or silver oxide should be employed, notwithstanding that nearly total recovery of the spent silver is possible and thus available for recycling in the process of the invention. we have found that oxidation can most satisfactorily be effected when the molar ratio of silver oxide to carbohydrate is from about 0.001 to 1 to about 5:1, depending on the carbohydrate utilized and the extent of oxidation desired.

The silver oxide used is normally argentous oxide $Ag_2O$, which tends to give a more selective oxidation of anhydroglucose units, but argentic oxide AgO can be used if desired.

By controlling the oxidation conditions, it is possible to oxidize selectively any carbohydrate having vicinal hydroxyl groups to any degree. For example, according to the present invention carbohydrates containing as little as 1% dicarboxyl content to a completely oxidized (i.e., 100% dicarboxyl) content can be made. In the case of oxidized starch as a detergency builder, we prefer to oxidize starch to the extent that the final product contains from about 60 to 70% dicarboxyl units.

According to another aspect of the present invention, the oxidation is effected using catalytic amounts of silver and/or silver oxide in the presence of air or oxygen, and in the presence of from about 1 to 10% by weight of a co-catalyst, such as palladium, platinum, chromium, copper, zinc, iron, cobalt, rubidium, niobium, vanadium, tungsten or manganese, as well as oxides of these metals which are suitably supported on conventional catalyst supports. When oxidized carbohydrates are prepared utilizing this aspect of the invention, the reaction media and temperatures are essentially as stated hereinabove, however, the amount of silver or silver oxide is considerably reduced to catalytic quantities (i.e., about 1/1,000 to 1/10 of the amounts stated above).

According to still another aspect of the present invention, the carbohydrates are oxidised under conditions whereby silver oxide is generated in situ in the aqueous alkaline reaction medium, using either electrolytic means or the addition of oxidising agents such as hydrogen peroxide, persulphate, ozone or hypohalites. More specifically, carbohydrates may be oxidized to any specified degree by contacting the carbohydrate with silver oxide in an aqueous alkaline medium while simultaneously passing air or oxygen containing ozone through the reaction medium until the desired degree of oxidation is afforded, whereupon the oxidized product is neutralized with a strong mineral acid such as hydrochloric acid to precipitate the colloidal silver phase and the product is separated by filtration, decantation, centrifugation or other conventional means known in the art.

The reaction media and temperatures employed are as previously stated and the ozone content of the air or oxygen passed thouugh the reaction media may vary from about 0.5% to about 4%, preferably about 1 to 3%. The amount of silver or silver oxide employed in this aspect of the invention is also a catalytic amount when compared to the amount of silver oxide employed when oxidation is effected using silver or silver oxide alone. Thus, the mole ratio of silver oxide (or silver) to carbohydrate will in this case vary from about 0.0005:1 to about 0.5:1 when an additional oxidizing agent such as ozone is used.

The invention is illustrated by the following Examples in which parts and percentages are by weight except where otherwise indicated.

EXAMPLE 1

In a 500 ml three-necked flask equipped with a stirrer, thermometer, and Ascarite drying tube is added a suspension formed from 9.1 gm (0.05 mole) of unmodified corn starch (containing 10.3% water) and 200 ml of distilled water and 12 ml of 50% sodium hydroxide solution. To this suspension is gradually added a dry mixture containing 31.0 gm (0.134 mole) of $Ag_2O$ and 7.0 gm (0.065 mole) of Ag powder. Reaction is initiated by heating to 40°–45°C and maintaining this temperature for about 2 hours. The reaction mixture is then stirred for an additional hour after which the pH is measured and adjusted to about 8 with concentrated HCl to precipitate all silver compounds from the reaction mixture. After separating the silver phase by filtration, the filtrate containing oxidized starch is concentrated to about 100 ml and the product is recovered by precipitation with an equal volume of ethanol to afford after decantation and drying in vacuo over $P_2O_5$, oxidized starch containing 71.8% dicarboxyl units and 28.2% anhydroglucose units, as determined by cation exchange and titration (corrected for water, NaCl and any $NaHCO_3$ that may be present and also for the equivalent amount of HCl which arises from the NaCl during cation exchange).

EXAMPLE 2

When the procedure of Example 1 is repeated using only $Ag_2O$ as the oxidizing agent (0.05 moles of unmodified corn starch and 0.13 moles of $Ag_2O$), there is afforded oxidized starch containing 75.5% dicarboxyl units.

EXAMPLE 3

When the procedure of Example 1 is repeated using 8 gm of sodium hydroxide, 0.05 moles of unmodified corn starch, 0.13 moles of $Ag_2O$ and 0.065 moles of Ag, there is afforded oxidized starch containing 70.2% dicarboxyl units.

EXAMPLE 4

To a 500 ml three-necked flask equipped with a stirrer, thermometer, and Ascarite drying tube is added 8.3 gm (0.05 mole) hydrolyzed corn starch (containing 2.4% water) and 200 ml of distilled water and 12 ml of % sodium hydroxide solution. To this is gradually added a dry mixture containing 31.0 gm (0.134 mole) of $Ag_2O$ and 7.0 gm (0.065 mole) of Ag powder. The reaction mixture is then stirred for 2 hours, during which time the temperature gradually rises to about 40°C and then falls. The pH of the reaction mixture is then adjusted to about 8 with concentrated HCl to precipitate all silver compounds from the reaction mixture. After separating the silver phase by filtration, the filtrate containing oxidized starch is concentrated by evaporation in vacuo to about 100 ml and the product is recovered by precipitation with an equal volume of ethanol to afford, after drying in vacuo over $P_2O_5$, oxidized starch containing 77.8% dicarboxyl units and 22.2% anhydroglucose units (as determined by cation exchange and titration).

EXAMPLE 5

To a 500 ml three-necked flask equipped with a stirrer, thermometer, and Ascarite drying tube is added 8.3 gm (0.05 mole) of hydrolyzed corn starch (containing 2.4% water) and 200 ml of distilled water and 12 ml of 50% sodium hydroxide solution. To this aqueous mixture is gradually added a dry mixture containing 21.0 gm (0.09 mole) of $Ag_2O$ and 7.0 gm (0.065 mole) of Ag powder. The reaction mixture is then stirred for an hour during which the temperature rises to about 40°C. The mixture is then left undisturbed for 16 hours after which the pH is adjusted to about 8 with concentrated HCl to separate all silver compounds from the reaction mixture. After separating the silver phase by filtration, the filtrate containing oxidized starch is concentrated by evaporation in vacuo to about 100 ml and the product is recovered by precipitation with an equal volume of ethanol to afford, after drying in vacuo over $P_2O_5$, oxidized starch containing 56.0% dicarboxyl units and 44% anhydroglucose units (as determined by cation exchange and titration).

When the aforementioned procedure is repeated and the reaction mixture is heated with stirring to 40°–45°C, oxidized starch having a dicarboxyl content of 57.7% is afforded within 2 hours.

EXAMPLE 6

To a 500 ml three-necked flask equipped with a stirrer, thermometer, and Ascarite drying tube is added 200 ml of an aqueous solution containing 0.025 moles of sucrose and 8.0 gm of sodium hydroxide. To this is rapidly added a dry mixture containing 0.13 mole of $Ag_2O$ and 7.0 gm (0.065 mole) of Ag powder. The temperature of the reaction mixture rises to 40°C and is maintained at 40°C with cooling and/or heating for 2.5 hours. After stirring for an additional 30 minutes, the pH of the reaction mixture was adjusted to about 8.5 with concentrated HCl to precipitate all silver compounds from the reaction mixture. After separatinng the silver phase by filtration, the filtrate containing oxidised starch is concentrated by evaporation in vacuo to about 100 ml and the product is recovered by precipitation with an equal volume of ethanol to afford, after drying in vacuo over $P_2O_5$, oxidized sucrose containing 79.5% tetracarboxyl sucrose (as determined by cation exchange and titration).

EXAMPLE 7

When the procedure of Example 6 is repeated using a sucrose/$ag_2O$/Ag ratio of 0.10:0.33:0.15, there is afforded an oxidized sucrose containing 80.5% dicarboxyl units.

EXAMPLES 8 to 16

50 millimoles of a polysaccharide is dissolved or suspended in 200 ml of boiled distilled water at 50°C. Silver oxide is then added followed by the addition of 50% sodium hydroxide solution. The reaction mixture is then maintained at 40°–45°C while stirring vigorously and passing a stream of air or oxygen containing 1–3% ozone into the reaction mixture via a dispersion tube at a rate to deliver about 72 mg of ozone per minute. After the prescribed amount of ozone has been added, the reaction mixture is diluted to 400 ml with distilled water and adjusted to pH 8.6 by the addition of concentrated hydrochloric acid. The catalyst phase is then filtered off and the filtrate concentrated to about 100 ml in vacuo and then freeze-dried. Alternatively, the concentrated filtrate may be treated with an equal volume of ethanol to precipitate the oxidized polysaccharide, which is then isolated by decantation of the supernatant solution followed by drying in a vacuum oven.

The oxidized polysaccharide is then analyzed for water, NaCl and sodium bicarbonate content. The dicarboxyl content of the oxidized polysaccharide is determined by cation-exchange of a sample and titration of the eluent with standard sodium hydroxide (corrected for water, NaCl and any sodium bicarbonate that may be present and also for the equivalent amount of HCl which arises from the NaCl during cation exchange).

The conditions used in the various Examples are shown in Table I below.

TABLE I

| Example[1] | Reactants (Millimoles) | | | Product Yield (g) | Dicarboxyl Content of Oxidised Starch[2] |
|---|---|---|---|---|---|
| | $Ag_2O$ | NaOH | Ozone | | |
| 8 | 3.9 | 100 | 67.1 | 13.1 | 81.5 |
| 9 | 1.3 | 150 | 67.1 | 16.0 | 70.0 |
| 10 | 1.3 | 150 | 104 | 16.2 | 92.9 |
| 11 | 3.9 | 150 | 134 | 15.0 | 102 |
| 12 | 1.3 | 228 | 90 | — | 82.9 |
| 13 | 10.0 | 150 | 88 | 15.4 | 94.7 |
| 14 | 25.0 | 150 | 88 | 15.2 | 103 |
| 15 | 50.0 | 150 | 88 | 14.9 | 109 |
| 16 | 7.8[3] | 150 | 88 | 15.8 | 74 |

[1]Examples 8 to 11 and 13 to 16 utilised commercial hydrolysed corn starch (Mor-Rex Hydrolysed Cereal Solids) from Corn Products Corp. and Example 12 utilised unmodified corn starch.
[2]All organic carboxyl groups are calculated as dicarboxyl starch, so that values greater than 100% indicate the presence of some tricarboxyl starch and/or other degradation products.
[3]7.8 millimoles of Ag metal used instead of $Ag_2O$.

c8 cellulose (Celufi; 6.4% O; 50% color cooling HCl 5% 5.5 g 79.4% 4.7% 15.9% sodium

EXAMPLE 17

8.65 g of cellulose (Celufi; 6.4% $H_2O$; 0.05 mole) is suspended in 200 cc water. Twelve ml of 50% NaOH is added followed by 31.0 g $Ag_2O$ and 7.0 g silver powder with stirring. The reaction mixture is then heated at 45°–50°C for 3 hours, during which the dark $Ag_2O$ color changes to light grey. After cooling to room temperature, concentrated HCl is added to bring the pH to 8.5. The solids are filtered by suction and the mother liquor is concentrated to 100 cc. Then, 140 cc EtOH (denatured with 5% MeOH) is added to the concentrate and the resulting white precipitate is separated by centrifuging and decanting the supernatant liquid. After drying the solid over $P_2O_5$ in a vacuum over, there is obtained 5.5 g of product containing 79.4% dicarboxyl cellulose, 4.7% water and 15.9% sodium chloride.

EXAMPLE 18

Methyl α-D-glucoside, 10.0 g, is dissolved in 200 ml of water. Then, 14.4 g of 50% sodium hydroxide solution is added followed by a mixture of 54.3 g of silver oxide and 12.7 g of powdered silver. The reaction mixture is stirred vigorously and the ensuing exothermic reaction allowed to raise the temperature to 35°–40°C. The reaction mixture is then maintained at 40°C for 2 hours after which it is cooled to room temperature and neutralized to pH 8.5 with concentrated hydrochloric acid. After filtering off the Ag/AgCl phase, the filtrate is concentrated in vacuo to about 75 ml and then mixed with 800 ml of ethyl alcohol (denatured with 5% McOH). The resulting crystalline preicpitate is then filtered and dried in vacuo over phosphorus pentoxide to give 13.3 g of product containing 83.0% disodium-α-methoxy-α'-hydroxymethyl-oxydiacetate as determined by NMR analysis ($D_2O$) using an internal standard of potassium biphthalate. The product may be further purified by recrystallization from ethanol-water.

EXAMPLE 19

9.1 g starch (Amaizo 100 Pearl, 10% moisture; 0.05 mole) was suspended in 200 ml water and to this was added 12 ml 50% NaOH slowly with cooling. Next was added 15.4 g AgO (85% of theoretical; prepared according to the method of Clarke et al., Can. J. Chem. 47 1653 (1969) and 7.0 g silver powder. The resulting reaction mixture was heated with stirring at 40°C for about 2 hours. Several color changes from black to green to grey were observed during this period. The reaction mixture was then cooled to room temperature and concentrated HCl added to bring the pH to 8.7 to permit the separation of the silver phase which was filtered by suction. The mother liquid was concentrated to 75 cc in a vacuum evaporator and mixed with 200 ml EtOH (denatured with 5% MeOH) to precipitate the product. After decantation of the organic liquid, the white sticky mass of oxidized starch was dried under vacuum over POhd 2 $O_5$. The dried product contained 4.9% NaCl, 0.8% water and 94.3 oxidized starch containing 50.2% COONa groups.

EXAMPLE 20

The procedure and quantities of Example 14 are followed except that 0.5 g of cobalt (II) acetate is added to the reaction mixture and oxygen is used in place of ozone. The oxygen is bubbled through the reaction mixture for 5 hours at a rate of 1.44 liters/hour (STP). At the end of this time, titration of a sample of the reaction mixture indicates the consumption of 49 millimoles of NaOH corresponding to about 50% of the theoretical oxidation (to dicarboxyl starch) and 195% oxidation over and beyond that due to the $Ag_2O$ reactant alone.

EXAMPLE 21

The procedure and quantities of Example 14 are followed except that 1.8 g of 10% Pd on carbon is added to the reaction mixture and oxygen is used in place of ozone. The oxygen is bubbled through the reaction mixture for 7.5 hours at a rate of 1.44 liters/hour (STP). At the end of this time, titration of a sample of the reaction mixture indicates a consumption of about 54 millimoles of sodium hydroxide corresponding to about 54% of the theoretical oxidation (to dicarboxyl starch) and 220% oxidation over and beyond that due to the $Ag_2O$ reactant alone.

EXAMPLES 22 to 24

0.05 mole of a disaccharide is dissolved in 200 cc water and 12 ml of 50% NaOH is added with cooling. To this is added 31.0 g $Ag_2O$ and 7.0 g silver powder and the resulting reaction mixture is heated to 40°C. An exothermic reaction quickly develops and ice-bath cooling is necessary to maintain the temperature at 40°C. After 2 hours at 40°C, the reaction mixture is cooled to room temperature and concentrated HCl is added to being the pH to 8.5. The silver phase is filtered by suction and the mother liquor concentrated to about 75 cc. The addition of 150–175 cc EtOH (denatured with 5% MeOH) to the concentrate results in the separation of a syrupy liquid. The supernatant solvent is decanted and the syrupy product dried over $P_2O_5$ in a vacuum oven. The dried products which are mainly tetracarboxyl derivatives are analyzed as follows:

| Example | Disaccharide used | % NaCl | % $H_2O$ | % COONa | Yield |
|---|---|---|---|---|---|
| 22 | cellobiose | 4.6 | 8.8 | 56.6 | 9.5 |
| 23 | maltose | 2.9 | 1.5 | 49.7 | 7.0 |
| 24 | lactose | 4.9 | 2.4 | 50.4 | 15.6 |

EXAMPLE 25

Methyl β-fructopyranoside is oxidized with silver oxide/silver according to the procedure given in Example 18 above for the preparation of disodium (α-methoxy-α-hydroxymethyl) oxydiacetate.

EXAMPLE 26

A mixture of methyl α-glucuronoside and its methyl ester is first prepared by heating for 2 hours at 100°C (autoclave) with stirring polyglucuronic acid (isolatable from cereal straws and grains) with five parts of methanol containing 10% by weight of 95% sulphuric acid. The mixture is discharged from the autoclave, neutralized with a methanolic solution of sodium methylate and evaporated to remove the methanol. The residue is then oxidized with a mixture of silver oxide/silver using the oxidation procedure described in Example 18 above and using a mole ratio of $Ag_2O$/Ag/NaOH/starting polyglucuronic acid of 3.0/1.5/3.0/1.0. The isolated product of trisodium (α-methoxyl α'-carboxy)-oxydiacetate is recrystallized from ethanol-water.

EXAMPLE 27

Ethyl β-D-fructofuranoside is oxidized according to the procedure of Example 18 above for the preparation of disodium (α-methoxy-α-hydroxymethyl) oxydiacetate, except that the mole ratio of $Ag_2O$/Ag/NaOH/-fructofuranoside is 3.0/1.5/2.5/1.0. The product, α-ethoxy-α,α'-bis(hydroxymethyl)oxydiacetate, is recrystallized from ethanol-water.

What is claimed is:

1. A process for preparing an oxidized carbohydrate which comprises oxidizing a carbohydrate selected from the group consisting of disaccharides, polysaccharides, oligosaccharides, and alkyl glycosides with an oxidizing agent selected from the group consisting of silver oxide or a mixture of silver and silver oxide, in an aqueous alkali metal hydroxide solution at a temperature of from about 20°–90°C, wherein the molar ratio of alkali metal hydroxide to carbohydrate is from about 2:1 to 4:1 and the molar ratio of oxidizing agent to carbohydrate is from 0.001:1 to about 5:1.

2. The process of claim 1 wherein the temperature of reaction is from about 20°–60°C.

3. The process of claim 1 wherein the disaccharide is sucrose, lactose, maltose and cellobiose.

4. The process of claim 1 wherein the polysaccharide is cellulose and starch.

5. The process of claim 1 wherein the silver oxide is argentous oxide, $Ag_2O$.

6. A process for preparing an oxidized carbohydrate which comprises oxidizing a carbohydrate selected from the group consisting of disaccharides, polysaccharides, oligosaccharides, and alkyl glycosides with ozone in combination with a catalytic amount of an oxidizing agent selected from the group consisting of silver oxide or a mixture of silver and silver oxide in an aqueous alkali metal hydroxide solution at a temperature of from about 20°–90°C, wherein the molar ratio of alkali metal hydroxide to carbohydrate is from about 2:1 to 4:1 and the molar ratio of oxidizing agent to carbohydrate is from 0.0005:1 to 0.5:1.

7. A process for preparing an oxidized carbohydrate which comprises oxidizing a carbohydrate selected from the group consisting of disaccharides, polysaccharides, oligosaccharides, and alkyl glycosides with air or oxygen in combination with a catalyst, selected from the group consisting of silver oxide or a mixture of silver and silver oxide, and a co-catalyst selected from the group consisting of palladium, platinium, chromium, copper, zinc, iron, cobalt, rubidium, niobium, vanadium, tungsten, manganese metals, the oxides of said metals and cobalt (II) acetate, in an aqueous alkali metal hydroxide solution at a temperature of from 20°–90°C, wherein the molar ratio of alkali metal metal hydroxide to carbohydrate is from about 2:1 to 4:1, the molar ratio of catalyst to carbohydrate is from 0.0005:1 to about 0.5:1, and the amount of co-catalyst is from 1 to 10% by weight of the catalyst.

8. The process of claim 7 wherein the co-catalyst is palladium.

9. The process of claim 7 wherein the co-catalyst is cobalt (II) acetate.

10. Tetracarboxyl sucrose composed of the following

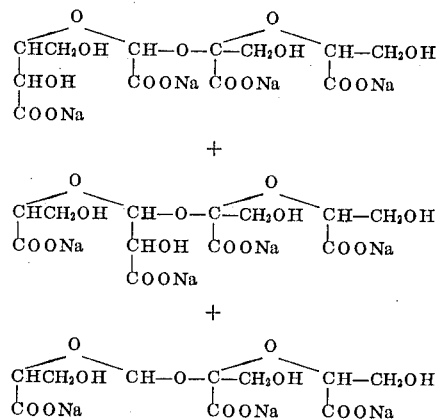

* * * * *